United States Patent Office 2,740,794
Patented Apr. 3, 1956

2,740,794
SYNTHESIS OF NOVEL VANADIUM PORPHYRIN

Willard H. Bonner, Jr., Baytown, Tex., assignor, by mesne assignments, to Esso Research and Engineering Company, Elizabeth, N. J., a corporation of Delaware No Drawing. Application July 26, 1954,
Serial No. 445,917

5 Claims. (Cl. 260—314)

The present invention is directed to a novel porphyrin of vanadium. More particularly, the invention is directed to a novel vanadium compound and a method of preparing same.

The present invention may be briefly described as vanadium tetraphenyl porphyrin having the structural formula:

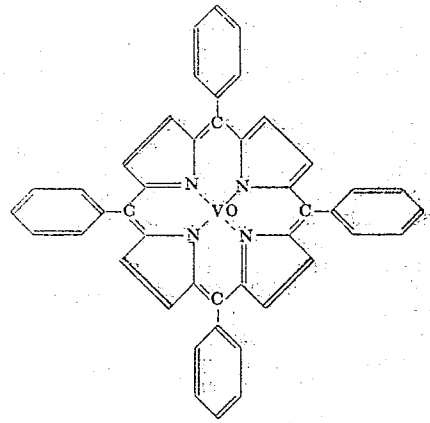

The present invention involves a method for producing vanadium tetraphenyl porphyrin having the structural formula described supra by reacting vanadium pentoxide and hydrochloric acid under refluxing conditions in which an aliphatic alcohol is added to the refluxing mixture. The refluxing is continued until the color of the mixture changes from dark red to bright green and finally to a dark blue or deep blue. Thereafter the pH of the solution is adjusted in a range of about 6.0 to about 7.0 whereby a precipitate is formed. The precipitate is recovered, for example, by filtration and then formed into a second admixture with naphthalene and tetraphenyl porphyrin. The second mixture is refluxed and a bright red melt is obtained. The melt is admixed with distilled water to form a third admixture from which solid material is recovered by filtration. Thereafter the recovered material is extracted in sequence with aliphatic alcohol or acetone to remove naphthalene and with chloroform to form a chloroform extract. The extract is dried to a residue which is fractionally extracted to leave a solid phase from which the vanadium tetraphenyl porphyrin is obtained by sublimation.

The alcohol employed in the practice of the present invention is preferably ethanol, but other aliphatic alcohols, such as methyl alcohol, isopropyl and propyl alcohols as well as the butyl alcohols may be used.

The pH of the solution may be adjusted by employing saturated sodium carbonate and the like.

The aromatic hydrocarbon which is used to extract the residue is preferably benzene but may be any low boiling aromatic hydrocarbon, such as toluene, ortho, meta or paraxylene or ethyl benzene, and the like.

The novel vanadium tetraphenyl porphyrin having the structural formula given supra is quite useful and may suitably be used as a buffer, as a dye for petroleum stocks and in insecticidal compositions, such as in solutions of hydrocarbons, and the like. Specifically, the vanadium tetraphenyl porphyrin may be used as an analytical standard in the analysis for oil soluble vanadium.

The present invention will be further illustrated by the following example:

Example 10 parts of vanadium pentoxide were placed in a reaction vessel to which 50 parts of concentrated hydrochloric acid were added. The mixture of vanadium pentoxide and concentrated hydrochloric acid was refluxed for about 15 minutes and thereafter two parts of ethanol were added and refluxing continued for 20 more minutes. During these operations the materials in the reaction vessel go through a series of color changes: dark red; bright green; and a clear, bright, dark blue color. In the synthesis of the novel compound of the present invention, it is important that the mixture develop the clear, bright, deep or dark blue color which must have no trace of green in it or be substantially free of green coloration.

Thereafter to the mixture in the reaction vessel saturated aqueous sodium carbonate solution is added until the pH of the solution is between about 6 and about 7. This causes the formation of a light cocoa colored precipitate. This precipitate is recovered, for example, by filtration and washed with 100 parts of distilled water in two 50 part increments. The water washed precipitate is then washed with 50 parts of absolute ethanol in two 25 part increments. The precipitate is dried and immediately removed from the filter with minimum exposure to and in the substantial absence of free oxygen, such as air. The washed precipitate is then placed in a second reaction vessel containing approximately 30–80 parts of naphthalene and approximately 5 parts of tetraphenyl porphyrin. A ratio of naphthalene to tetraphenyl porphyrin in the range from about 6 to about 15:1 may be used with satisfactory results being obtained at a ratio of at least about 6:1. The mixture in the second reaction vessel is refluxed at about 217° C. until a bright red melt is obtained. The melt is poured into approximately 500 parts of distilled water while stirring.

The solid material is then recovered by filtering the mixture from the second reaction vessel and the solid material is broken up into lumps or granular bodies. The granular bodies are then extracted with ethanol or acetone for several hours in an extractor similar in structure to the Soxhlet extractor, for approximately 3 to 6 hours. When removal of naphthalene is complete by solution in the ethanol, the remaining material is extracted with chloroform in a similar extraction apparatus to form a chloroform extract which is recovered. The chloroform extract is evaporated to dryness to form and recover a residue. This residue is then fractionally extracted with aromatic hydrocarbons, such as benzene and the like. The material which is less soluble than benzene is the vanadium tetraphenyl porphyrin having the structural formula set out supra. This is a solid phase which may be sublimed at 880° F. under reduced pressure; for example, 1 micron to obtain the vanadium tetraphenyl porphyrin as octahedra having a dark red-violet coloration.

It was found that the product obtained, as has been described, contained approximately 7.50% vanadium and was obtained in yields of about 70% based on the theoretical yields.

The vanadium tetraphenyl porphyrin having the structural formula given supra sublimes at a temperature of 830° to 880° F. at 1 to 5 microns and is characterized by having a very high melting point, limited solubility in organic solvents, and the following analysis: Calculated for $C_{44}H_{28}N_4OV$: C, 77.75; H, 4.15; N, 8.24; V, 7.50%. Found: C, 77.73; H, 4.36; N, 8.64; V, 7.48%.

This compound is solid at 460° C. which is higher than any known compound given in the handbook references. The high sublimation temperature indicates thermal stability.

The vanadium tetraphenyl porphyrin is a new compound not found in nature and has the structural formula as given supra wherein the vanadium is linked to the nitrogen by co-valent bonds with the phenyl groups being disposed in the structure as shown attached to the carbon atoms.

The nature and objects of the present invention having been completely described and illustrated, what I wish to claim as new and useful and to secure by Letters Patent is:

1. A method for producing vanadium tetraphenyl porphyrin which comprises refluxing a mixture of a minor amount of vanadium pentoxide and a major amount of hydrochloric acid, adding a saturated aliphatic alcohol containing 1 to 4 carbon atoms to the refluxing mixture and continuing the refluxing until a solution having a clear, bright, deep blue color develops, adjusting the pH of the solution to a pH in the range from about 6.0 to about 7.0 to form a precipitate, recovering the precipitate in the substantial absence of air, forming a second admixture of the precipitate with naphthalene and tetraphenyl porphyrin, said naphthalene and tetraphenyl porphyrin being in the ratio of at least about 6 to 1, refluxing the second admixture until a bright red melt is obtained, admixing the melt with distilled water to form a third admixture, recovering solid material from the third admixture, extracting the solid material with a solvent selected from the group consisting of the aliphatic alcohols and acetone to remove naphthalene, extracting remaining solid material with chloroform to form a chloroform extract, drying the chloroform extract to form a residue, fractionally extexrating the residue with a low boiling aromatic hydrocarbon to form an aromatic hydrocarbon soluble phase and a solid phase, and subliming said solid phase to obtain vanadium tetraphenyl porphyrin therefrom.

2. A method in accordance with claim 1 in which the aliphatic alcohol is ethanol and the aromatic hydrocarbon is benzene.

3. A method in accordance with claim 1 in which the bright red melt is obtained by refluxing the second admixture at a temperature of about 217° C.

4. A method for producing vanadium tetraphenyl porphyrin which comprises refluxing a mixture of vanadium pentoxide and concentrated hydrochloric acid in a ratio of approximately 1 part of vanadium pentoxide to approximately 5 parts of acid, adding ethanol to the refluxing mixture and conducting the refluxing operation for a sufficient length of time until the refluxing mixture goes through a series of color changes from dark red to bright green and finally to a clear, bright, deep blue substantially free of green coloration, neutralizing the refluxed mixture to a pH in the range from about 6.0 to about 7.0 by adding saturated aqueous sodium carbonate solution to the neutralized mixture to form a precipitate having a light cocoa color, filtering the precipitate and washing same in sequence with distilled water and ethanol, removing the water and ethanol from the washed precipitate in the substantial absence of air, forming a second admixture of the washed precipitate with naphthalene and tetraphenyl porphyrin, said naphthalene and tetraphenyl porphyrin being in a ration of at least about 6:1, refluxing the second admixture at a temperature of about 217° C. until a bright red melt is obtained, admixing the melt with water and filtering the resulting admixture to obtain a granular body, extracting the granular body with a solvent selected from the group consisting of ethanol and acetone to remove naphthalene therefrom and then extracting the naphthalene-free body with chloroform to form an extract comprising a solution of chloroform soluble materials removed from the body, removing chloroform by evaporating the chloroform solution to form a residue, fractionally extracting the residue with benzene to form a benzene phase and an extract residue phase, and then subliming the extract residue phase at a temperature of about 830° to 880° F. under reduced pressure to obtain vanadium tetraphenyl porphyrin.

5. A method in accordance with claim 4 in which the ratio of naphthalene to tetraphenyl porphyrin is in the range from about 6:1 to about 30:1.

References Cited in the file of this patent

Chem. Abst.: vol 5, p. 3293; vol. 24, p. 2204; vol. 27, p. 1054; vol. 28, p. 3694; vol. 29, p. 2699.